(12) United States Patent
Bolik et al.

(10) Patent No.: US 9,342,526 B2
(45) Date of Patent: May 17, 2016

(54) PROVIDING STORAGE RESOURCES UPON RECEIPT OF A STORAGE SERVICE REQUEST

(71) Applicant: International Business Machines Corporation, Armonk, NY (US)

(72) Inventors: Christian Bolik, Oldenburg (DE); Michael Fiedler, Mainz (DE); Daniel Michel, Mainz (DE); Dietmar Noll, Mainz (DE); Christoph Reichert, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 13/851,593

(22) Filed: Mar. 27, 2013

(65) Prior Publication Data

US 2013/0318134 A1    Nov. 28, 2013

(30) Foreign Application Priority Data

May 25, 2012  (GB) .................................. 1209209.4

(51) Int. Cl.
| | | |
|---|---|---|
| *G06F 7/00* | (2006.01) | |
| *G06F 17/30* | (2006.01) | |
| *G06F 9/50* | (2006.01) | |
| *G06F 3/06* | (2006.01) | |

(52) U.S. Cl.
CPC ........ *G06F 17/30194* (2013.01); *G06F 3/0607* (2013.01); *G06F 3/067* (2013.01); *G06F 3/0631* (2013.01); *G06F 3/0632* (2013.01); *G06F 9/5011* (2013.01); *G06F 2209/501* (2013.01)

(58) Field of Classification Search
CPC . G06F 17/30194; G06F 9/5011; G06F 3/067; G06F 3/0631; G06F 3/0632; G06F 3/0607; G06F 2209/501
See application file for complete search history.

(56) References Cited

U.S. PATENT DOCUMENTS

| | | |
|---|---|---|
| 5,239,647 A | 8/1993 | Anglin et al. |
| 5,946,660 A | 8/1999 | McCarty et al. |
| 6,182,022 B1 | 1/2001 | Mayle et al. |

(Continued)

FOREIGN PATENT DOCUMENTS

| | | |
|---|---|---|
| JP | 2005050007 A | 2/2005 |
| WO | WO2011/002777 A2 | 1/2011 |
| WO | WO2011/067099 A2 | 6/2011 |

OTHER PUBLICATIONS

U.S. Appl. No. 12/351,894.

(Continued)

*Primary Examiner* — Marc Somers
(74) *Attorney, Agent, or Firm* — Francis Lammes; Stephen J. Walder, Jr.; Joseph Petrokaitis (57) ABSTRACT

A mechanism is provided for providing storage resources of a storage management system. A storage service request is received comprising an indication of a service class. A determination is made of all resource managers mapped to the indicated service class according to a first mapping. For each of the determined resource managers: a determination is made of selected ones of all the storage resources controllable by the determined resource manager; monitoring data of the selected storage resources is gathered; the gathered monitoring data is compared for calculating a score for each one of the selected storage resources; and at least one function of the determined resource manager operable to control the storage resource having an optimum score is called.

19 Claims, 3 Drawing Sheets

(56) References Cited

U.S. PATENT DOCUMENTS

| | | |
|---|---|---|
| 7,093,088 B1 | 8/2006 | Todd et al. |
| 7,647,329 B1 * | 1/2010 | Fischman et al. .......... 707/999.1 |
| 7,653,781 B2 | 1/2010 | Dawkins |
| 7,681,001 B2 | 3/2010 | Maruyama et al. |
| 7,945,640 B1 | 5/2011 | VanTine |
| 2002/0103969 A1 | 8/2002 | Koizumi et al. |
| 2002/0187750 A1 | 12/2002 | Majumdar |
| 2002/0194171 A1 | 12/2002 | Judd et al. |
| 2003/0055882 A1 | 3/2003 | Kawamura |
| 2003/0135609 A1 | 7/2003 | Carlson et al. |
| 2005/0268308 A1 * | 12/2005 | Tang et al. .................... 719/328 |
| 2006/0236061 A1 | 10/2006 | Koclanes |
| 2007/0043923 A1 | 2/2007 | Shue |
| 2007/0143756 A1 | 6/2007 | Gokhale et al. |
| 2007/0283119 A1 | 12/2007 | Sarkar et al. |
| 2009/0182777 A1 | 7/2009 | Bolik et al. |
| 2009/0216910 A1 | 8/2009 | Duchesneau |
| 2010/0332401 A1 | 12/2010 | Prahlad et al. |
| 2010/0332454 A1 | 12/2010 | Prahlad et al. |
| 2010/0332479 A1 | 12/2010 | Prahlad et al. |
| 2010/0333116 A1 | 12/2010 | Prahlad et al. |
| 2011/0154350 A1 | 6/2011 | Doyle et al. |
| 2012/0005236 A1 | 1/2012 | Deng et al. |
| 2013/0159637 A1 * | 6/2013 | Forgette et al. ............... 711/154 |

OTHER PUBLICATIONS

Bairavasundaram, Lakshmi N. et al., "Italian for Beginners: The Next Steps for SLO-Based Management", Proceedings of the 3rd USENIX conference on Hot Topics in Storage and File Systems, 2011, 5 pages.

Gencay, Eray et al., "Towards SLA-Based Optimal Workload Distribution in SANs", IEEE, Network Operations and Management Symposium, Apr. 7-11, 2008, pp. 755-758.

Haripriyan, Jayanthy et al., "A Structured Model for Service Level Management", Microsoft Corp., www.ip.com, IPCOM000160779D, Nov. 28, 2007, 10 pages.

Search Report under Section 17(5) dated Sep. 14, 2012, Application No. GB1209209.4, 3 pages.

Min, Wong H. et al., "Dynamic Storage Resource Management Framework for the Grid", Proceedings of the 22nd IEEE/13th NASA Goddard Conference on Mass Storage Systems and Technologies (MSST'05), Monterey, California, Apr. 11-14, 2005, 8 pages.

* cited by examiner

Figure 4

PROVIDING STORAGE RESOURCES UPON RECEIPT OF A STORAGE SERVICE REQUEST

BACKGROUND

The invention relates to the field of data storage management, and more particularly to the provision of storage resources as a service.

The demand for the automated management of an IT infrastructure, in particular the management and provision of storage space has been constantly growing. The provision of storage space to a plurality of clients is typically based on a contract comprising a so called "service level agreement" (SLA) specifying the level of service a storage provider has agreed to provide to the respective client. Service level agreements can contain numerous storage capacity and/or storage performance metrics which may be expressed in the form of service-level objectives (SLOs). Technically, storage capacity may be provided by various forms of IT services, e.g. by means of a cloud computing environment or other service based delivery models. An example of a cloud server environment being operable to perform data storage operations supporting a variety of clients that may connect of the system is disclosed in WO 2011/002777 A2. Another example of a storage infrastructure is described in US 2009/0182777 A1. The described storage infrastructure ensures that customer data is stored on appropriate storage components satisfying a set of SLO policies.

Current IT-systems used by service providers to offer and provide storage capacity to their clients are inflexible. In case the service provider offers multiple different service levels corresponding to different sets of SLOs to the clients, each of said service levels is tightly coupled to a particular set of storage resources being operable to provide their respective storage capacity in accordance with their respectively assigned service level and SLOs. For example, hard discs or storage pools with very short response times (which tend to be expensive) may be assigned to a high-quality (and more expensive) service level while slow storage resources, e.g. tape drives, may be assigned to a service level suited for doing back-up jobs. Said assignment is based on a direct mapping of parameters required by the respective proprietary Application Programming Interfaces (APIs) of the storage resources to the service level provided. Often, said mapping is specified within compiled code sections of the storage management system. Adding or removing storage resources to the storage management system or reassigning a storage resource to another service level requires a manual modification and maybe even recompilation of elements of the service management infrastructure. Due to the plurality of storage models, storage types, storage vendors and other factors from which an API providing access to a given storage resource may depend, the configuration and assignment of the storage resources to different service levels is a time consuming task in state of the art storage management systems, resulting in inflexible systems being difficult to maintain and operate.

Some other state of the art systems allow the clients to directly query and access the storage resources. However, said approach does not increase the flexibility of storage resource assignment, but merely shifts the problems associated with maintaining an association of service levels to proprietary storage resource APIs from the service provider to the client.

The inflexible assignment of storage resources to service levels further bears the problem that multiple requests for the same storage service might cause bottlenecks and available storage capacity may not be optimally used.

SUMMARY

In one illustrative embodiment, a computer-implemented method is provided for providing storage resources of a storage management system (SMS). The illustrative embodiment receives a storage service request comprising an indication of a service class, the indicated service class is a data object having one or more requirements to be fulfilled by any storage service provided in accordance with the service class. The illustrative embodiment determines all resource managers mapped to the indicated service class according to a first mapping, each resource manager being a runtime data object comprising a generic API providing control over one or more of the storage resources. For each of the determined resource managers, the illustrative embodiment determines selected ones of all the storage resources controllable by the determined resource manager; gathers monitoring data of the selected storage resources, the gathered monitoring data is indicative of free capacities of the selected storage resources; compares the gathered monitoring data with the one or more requirements of the indicated service class for calculating a score for each one of the selected storage resources; and calls at least one function of the determined resource manager operable to control a storage resource having an optimum score via the generic API associated with the resource manager thereby configuring or initializing the storage resource to provide the storage service in accordance with the indicated service class.

In a further aspect, the invention relates to a computer-readable medium comprising computer-readable program code embodied therewith which, when executed by a processor, cause the processor to perform various ones of, and combinations of, the operations outlined above with regard to the method illustrative embodiment.

In a further aspect the invention relates to a computer system operatively coupled to a plurality of storage resources. The computer system comprises an interface for receiving a storage service request and a SMS for managing the storage resources. The SMS is adapted for performing various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

In the following, preferred embodiments of the invention will be described in greater detail by way of example, only making reference to the drawings in which.

DETAILED DESCRIPTION

A 'storage management system' (SMS) as used herein encompasses any kind of monolithic or distributed program logic being operable to receive storage service requests from one or more client devices and being operable to automatically provide storage capacity to the clients in response to said request. The program logic may be software-based, firmware-based and/or hardware-based. The storage capacity is derived from one or more storage resources being controlled by the SMS. Controlling a storage resource may comprise configuring, initializing and/or managing of storage capacities and functions provided by a storage resource in order to provide storage capacities of said storage resources as the requested service. For example, the IBM Tivoli storage productivity center may be used as the SMS.

A 'storage resource' as used herein encompasses one or more computer-readable storage devices or storage device components which are controlled in a concerted manner via a common interface. Typically, said interface is specific to the vendor and/or the type and/or the model of the storage resource. A storage resource may be any of the following: a physical storage volume, a logical storage volume, a physical storage device comprising one or more physical storage volumes, or a storage pool comprising a plurality of physical and/or logical storage volumes. A physical storage volume may be a hard disk, a hard disk partition, or a Logical Unit Number (LUN) of a storage device. The SMS may treat any one of the physical volumes as a sequence of chunks called physical extents. A logical storage volume is a storage volume whose storage blocks (or 'blocks') are mapped to one or more physical storage volumes. A physical storage device can be, for example, a Fiber Channel disk, a Mirrored disk, a RAID protected disk, a SATA drive, a network attached storage, a short tape, a WORM tape, an Encryption Tape, a Long tape, a Flash drive, solid state discs (SSD), Serial ATA discs (SATA) and various optical storage devices. A storage resource of a SMS may be physically integrated within the computer system hosting the SMS or may be connected to said computer system via a network connection, typically a TCP/IP connection.

A 'service level objective' (SLO) as used herein is a set of one or more parameter-value pairs being descriptive of e.g. the available storage capacity, storage accessibility, retention time, the security of the stored data or performance. Said parameter-value pairs may e.g. indicate the mean time between failures, mean time to repair, data transfer rates or similar measurable details being characteristic for a particular service level. At least some of the service level objectives may be used to specify the minimum or maximum property value(s) allowable for any storage capacity provided as a service of a selected service level having assigned said SLOs.

A 'service class' as used herein is a data object representing a predefined service level of a storage service, whereby said service level corresponds to a set of requirements any storage service provided in accordance with said service level has to comply to. Preferentially, said requirements are represented in the form of one or more service level objectives (SLOs) corresponding to said service level and being stored in association with the service class representing said service level. A data object may be, for example, an entry in a relational database, a file, in particular an XML file, or a binary file. It may also be an element of a file, e.g. an XML element of an XML file or a line in a file comprising a table.

A 'resource manager' as used herein is a runtime data object exposing a generic API to a SMS for allowing said SMS to control one or more storage resources controlled by said resource manager via said generic API. A runtime data object is a program logic executed by a processor. A resource manager may comprise one or more program routines executed upon receipt of a call via the generic API, wherein said program routines are operable to call proprietary methods of a respectively controlled storage resource via a proprietary interface of said storage resource.

A 'generic API' of a resource manager as used herein is an application program interface (API) allowing to access and call some functions of the resource manager via said generic API. The term 'generic' denotes that the API is not specific for the vendor or model of the storage resources controlled by the resource manager. According to preferred embodiments, the generic API comprises methods and attributes being specified in accordance with a non-proprietary meta-model of storage functions and capabilities to be provided by the SMS to a client upon request, whereby the generic API abstracts from the particularities of the storage resources. Said particularities may relate to the vendor, manufacturer or other property of the storage resource.

The term 'monitoring data' indicates a computational load of a storage resource at a given moment in time. Monitoring data may comprise, for example, the occupied and/or free storage space on a storage resource, the number of input and/or output operations (I/O operations) per time executed on said storage resource, the amount of data written to and/or read from the storage resource, a response time in respect to an I/O request, etc.

A 'storage service request' as used herein is a computer-interpretable request of a client, e.g. a mobile phone or a computer system, for being granted access to storage capacity of a particular kind and offering a particular level of service.

A 'mapping' as used herein is a storage space comprising data assigning two or more entities to each other. The assignment may be implemented e.g. by one or more tables of a relational database or by one or more files, e.g. XML files.

A 'storage model' as used herein is an identifier of the physical device type providing or underlying the storage resource. The storage model is a manufacturer- and/or vendor coined category. Examples of two storage models provided by a vendor "IBM" are "IBM DS8000" and "IBM XIV".

A 'storage type' as used herein denominates the type of access to data stored on a storage resource supported by said storage resource. For example, a storage resource having organized its stored data within a file system may have the storage type 'file system', another storage resource accessible via block-based SCSI commands may have the storage type 'block' while the data of still another storage resource may be accessible via a proprietary data I/O interface such as Amazon's S3 protocol, said storage resource having the storage type 'object'.

A 'vendor' as used herein is an identifier of the organization having sold the storage resource and/or having manufactured the storage resource.

Said features may be advantageous as a highly flexible coupling of the requested service level (represented by the indicated service class) and the storage resources actually used for providing the requested storage capacity is provided. The coupling allows a dynamic (at runtime of the SMS) selection of the storage resources used for providing the service in dependence on the current load of the storage resources. Thus, a better use of available storage capacity is provided and costs for additional hardware can be avoided.

The usage of resource managers as an additional instance between the individual storage resources and the service classes is advantageous as said additional mapping element increases the flexibility of the mapping and allows mapping service classes to generic, storage-related functions provided by the resource managers rather than directly mapping the service classes to proprietary interfaces of the storage resources. This feature may also ease maintainability, because the only components which are tightly bound to the proprietary interfaces of the storage resources are the storage managers. As the resource managers expose a generic API, the first mapping may allow to flexibly and generically reassign service classes to different abstract storage functions (such as formatting, indexing, mirroring, etc) provided by other resource managers without burdening the operator with the requirement to dig into the details of any proprietary API of one of the storage resources.

According to preferred embodiments, the first mapping (between service classes and resource managers) is a data structure that can be edited and becomes effective without any recompilation of source code. The first mapping may be, for example, a configuration file or an entry in a relational database. Said features may be advantageous as the service provider may reassign a plurality of storage resources to a different service level by editing a single entry comprising a mapping of the resource manager controlling said resources to another service level.

The storage request may be a request for storage capacity in accordance with the SLOs assigned to the requested service class. For example, a storage service request for backup storage space will typically indicate a service class requiring storage space with large storage capacity, whereby comparatively large response times may be considered as acceptable. A storage service request for storage to be used by an application program executing a plurality of I/O operations will typically require the assignment of storage resources having short response time. According to some embodiments, the storage capacity is provided in response to the service request by means of a cloud computing environment. Upon receipt of the storage service request, the SMS may invoke each of the selected resource managers, i.e., resource managers associated with resources able to provide the requested service class, in order to obtain a score for resources managed by said the selected resource managers respectively. This score may be used by the SMS in deciding which resources to allocate storage capacity on in order to fulfill said request. Preferentially, the SMS selects a score-calculation algorithm from a plurality of available score calculation algorithm in dependence on the indicated service class. In dependence on the selected algorithm, different input parameters may be used such as the rate of input/output operations per time unit ("I/O rate"), or the I/O rate per capacity unit, or simply the amount of unused storage capacity on the resource. Preferentially, providing storage capacity is implemented as granting the client read and/or write access to storage capacity provided by the one or more storage resources having assigned an optimum score value. Said features may result in a form of load balancing across resources available to fulfill a storage service request, e.g. a request for a particular amount of storage capacity, thereby preventing bottlenecks.

In case of a positive correlation of score value and the amount of free storage capacity and/or the level of storage quality, the highest calculated score value is considered as optimum score. Otherwise, the lowest calculated score value is considered the optimum score. The score may be indicative of free storage capacities in respect to the requirements of all available service classes or selectively in respect to the indicated service class. According to some embodiments, the score is calculated for all storage resources of the SMS by the same scoring algorithm taking as input, for example, the free storage space, the current I/O load etc. According to other embodiments, the score is calculated by a scoring algorithm being particular to the service class indicated in the request. This may be advantageous as a storage service request for backup storage capacity may have different requirements (SLOs) than, for example, a request for storage space to be used by an I/O intensive application program (see above).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A cloud computing environment is service oriented with a focus on statelessness, low coupling, modularity, and semantic interoperability. At the heart of cloud computing is an infrastructure comprising a network of interconnected cloud computing nodes. It is understood in advance that although this disclosure may be used in a cloud computing environment, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics and at least three service models. Characteristics may be as follows: On-demand self-service, broad network access, resource pooling, rapid elasticity, and measured service. Service Models may be as follows: Software as a Service (SaaS), platform as a service (PaaS), Infrastructure as a Service (IaaS). In the following, like numbered elements in these figures are either similar elements or perform an equivalent function.

Figure 1:
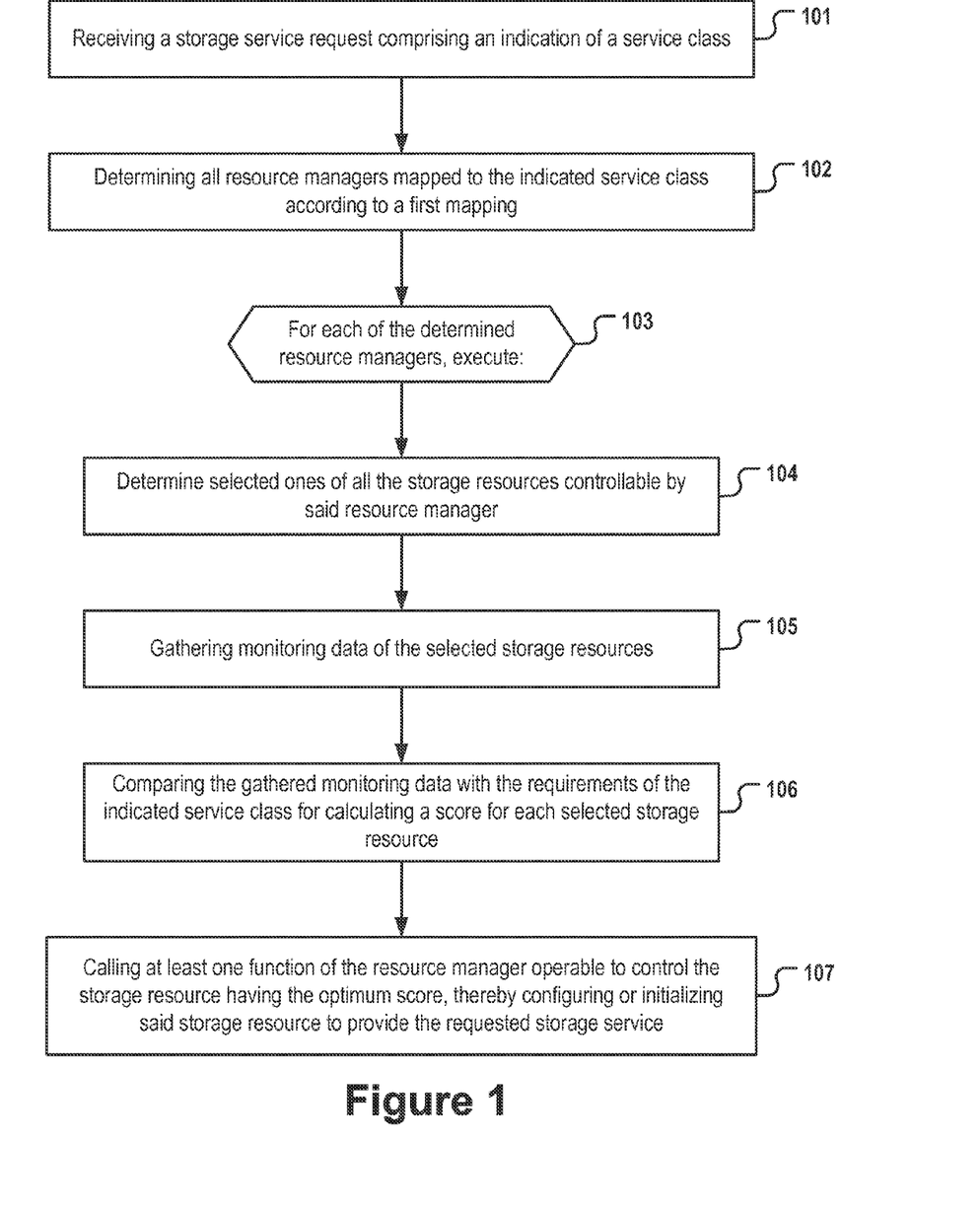
FIG. 1 shows a flowchart of an embodiment of the invention.
Figure 2:
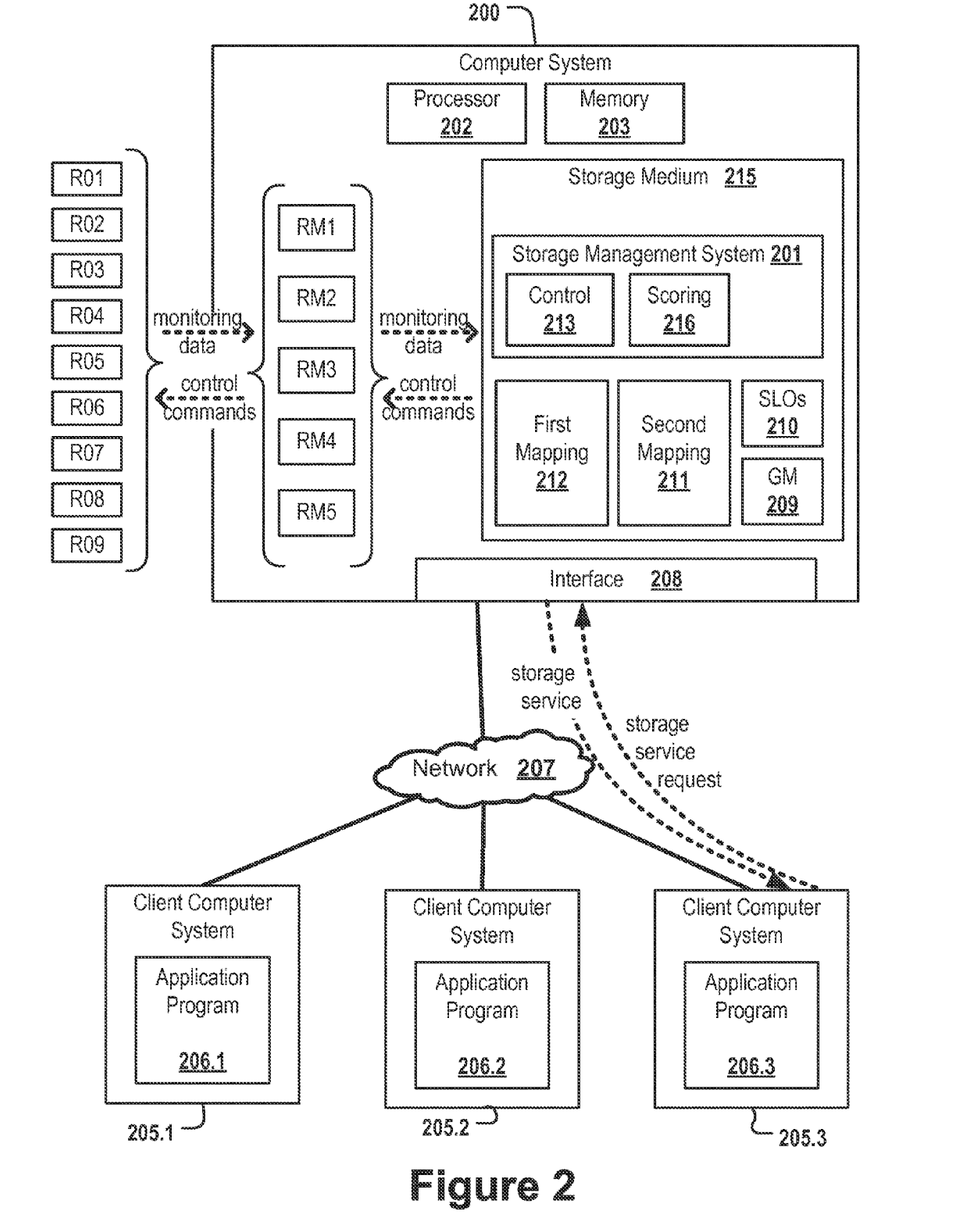
FIG. 2 shows a SMS and three clients.

FIG. 1 shows a flowchart of a method for providing storage resources of a storage management system (SMS) as depicted in FIG. 2. In the following, the method will be described by making reference to elements of FIGS. 1 and 2. In a first step 101, the SMS 201 hosted by computer system 200 receives a storage service request which comprises an identifier of a service class. The request may be submitted by an application program 206.1, 206.1, or 206.3 of a client computer system 205.1, 205.2, or, 205.3, respectively, via a network 207. Each service class may have assigned a set of requirements 210, also referred herein as service level objectives SLOs 210 any storage provided in accordance with said service class needs to comply to. The SMS 201 determines in step 102 all resource managers RM1-RM5 which are mapped to the service class indicated in the request according to a first mapping 212. In step 103 the SMS 201 begins to loop over the determined resource managers for executing the steps 104-107 for each of the determined resource managers. In step 104, the SMS 201 determines selected ones of all the storage resources R01-R09 controllable by the current resource manager of the loop. The totality of storage resources controllable by the current resource manager may be hard coded within the source code of the resource manager or may be implemented by a mapping referred herein as 'general mapping' 209 which may be, for example, a file or a database entry. The determination of the selected ones may be based on a parameter value contained in the first mapping 212 and optionally also on mapping information contained in the second mapping 211. In step 105, the storage management module gathers monitoring data from the selected storage resources. The gathering may be implemented based on a push or pull approach. According to embodiments, each resource manager is operable to monitor all storage resources the resource manager is in control of and to forward the monitoring data to a control module 213 of the SMS 201. The SMS 201 compares in step 106 the gathered monitoring data with the requirements 210 of the indicated service class for calculating a score for each selected storage resource utilizing scoring module 216. After having calculated a score for each selected storage resource for each of the determined resource managers, the resource management system calls in step 107 at least one function of the resource manager operable to control the storage resource having an optimum score. Calling said resource manager comprises configuring or initializing said storage resource for providing the requested storage service to the client in accordance with the selected service class's requirements. For example, a client may send a request for storage capacity of 500 GB being indicative of a service class 'RetentionControlled' to the SMS 201. The SMS 201 may interpret said request as a request to create a storage capacity of type 'file' with capacity 500 GB, and allocate said storage capacity to resources being operable to provide 'Retention-Controlled' storage space and being not already occupied or under heavy load. The response may consist merely of a path the client may use to access the requested storage capacity. In addition or alternatively, the response may include a confirmation that the requested capacity value (like here, "500 GB") is available and can be accessed. The response may also comprise some credentials for accessing the storage capacity.

FIG. 2 shows a block diagram of the SMS 201 of a computer system 200 comprising a processor 202 and memory 203. The SMS 201 comprises or is operatively coupled via a network connection to a plurality of storage resources R01-R09 and a plurality of resource managers RM1-RM5. The SMS 201 comprises a control module 213 and a scoring module 216 for calculating the score in step 106. The SMS 201 has access to a first mapping 212 and a second mapping 211 stored on storage medium 215. The SMS 201 is adapted to access a plurality of requirements (SLOs) 210 assigned to one or more service classes, and to access a general mapping 209. The computer system 200 further comprises an interface 208, e.g. a network card, for receiving storage service requests from a client 205 via a network 207. According to other embodiments (not shown), the components of the computer system 200, in particular the resources R01-R09 and resource managers RM1-RM5 may be hosted by other processing devices, thereby reducing the load of computer system 200.

Figure 3:
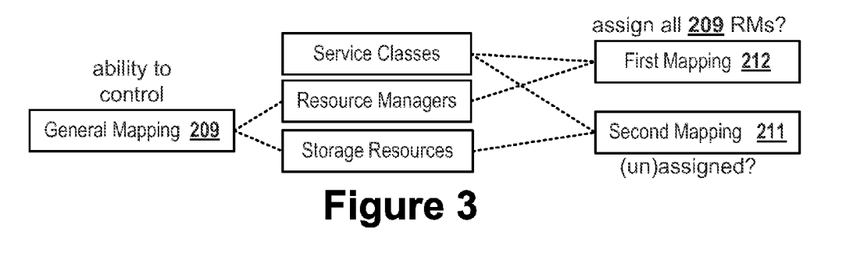
FIG. 3 is an overview on a plurality of mappings.

FIG. 3 provides an overview of the plurality of mappings and their respective functions. A general mapping 209, which may be an editable configuration file or may be hard-coded within each of the resource managers, assigns all storage resources controllable by a particular resource manager to said resource manager. Thus, all storage resources comprising proprietary method interfaces said resource manager is operable to call may be mapped in the general mapping to said resource manager. The first mapping 212 maps each service class to one or more resource managers. A parameter value within the first mapping of a given service class thereby indicates if all storage resources assigned to a given resource manager according to the general mapping 209 shall per default be assigned to the service class, i.e., shall be used for calculating a score and possibly provide storage capacity according to the requirements of said given service class. A second mapping 211 assigns or unassigns individual storage resources directly to or from one or more service classes. A second parameter value within the second mapping indicates whether the assignment between a given service class and a given storage resource in the second mapping should have the effect of using said storage resource for providing storage capacity in accordance with the requirements of said given service class or if said assignment should have the effect of excluding that said resource from a per-default assignment specified in the first mapping.

In the following, an embodiment will be described in greater detail in respect to the underlying mappings. A SMS according to said embodiment may comprise or be operatively coupled to a plurality of storage resources respectively being of a particular storage type, having been provided by a particular vendor and comprising at least one main functionality. For each unique combination of said property values, a corresponding resource manager is created and added to the SMS for controlling the respective storage resource:

TABLE 1 distinct resource managers for distinct property value sets

| Resource Manager | vendor | model | Functionality | Storage Type |
|---|---|---|---|---|
| SnapshotFileForIBMSONAS | IBM | SONAS | Snapshot | File |
| AsyncMirrorFileForIBMSONAS | IBM | SONAS | Asynchronous Mirroring | File |
| AsyncMirrorSnapshotFileForIBMSONAS | IBM | SONAS | Snapshot with Asynchronous Mirroring | File |
| HighPerformanceFileForIBMSONAS | IBM | SONAS | Solid State Disks | File |
| SnapshotFileForNetApp | NetApp | FAS2000 | Snapshot | File |
| HighPerformanceFileForNetApp | NetApp | FAS2000 | Solid State Disks | File |
| FlashCopyBlockForIBMDS8000 | IBM | DS8000 | Snapshot | Block |
| GlobalMirrorBlockForIBMDS8000 | IBM | DS8000 | Asynchronous Mirroring | Block |
| HighPerformanceBlockForDS8000 | IBM | DS8000 | SolidState Disks | Block |
| FlashCopyBlockForIBMSVC | IBM | SVC | Snapshot | Block |
| GlobalMirrorBlockForIBMSVC | IBM | SVC | Asynchronous Mirroring | Block |
| ... | ... | ... | ... | ... |

The resource managers comprise program logic for controlling, i.e., managing and/or configuring, the functionalities of the supported storage resources in accordance with said resource's storage type and device characteristics. For example, resource managers supporting storage type "File" implement generic interface methods for creating file systems, creating shares so remote clients can access the file system, deleting shares and file systems, etc. Likewise, resource managers supporting storage type "Block" implement generic interface methods for the configuration of LUN creation, mapping and masking depending on the requested access details for the block device, etc. The resource manager-specific implementation of these methods takes care of performing any additional, vendor and model-specific configuration of the respective storage resource in order to cause the created storage capacity unit (for instance file system or LUN) to expose the functionalities advertised by the resource manager via corresponding generic method interfaces and to provide said functionalities to the client having submitted the storage service request. The type of storage capacity units is not restricted to file systems or LUNs, but may also be any other type of storage capacity like object-based or other types of storage. The resource managers are mapped to service classes in a first mapping 212. For example, above resource managers may be mapped to service classes having been defined by a cloud service provider as follows:

For each of the service classes the service provider may provide a high-level, product-agnostic description of the kind and level of service it represents. The list of service classes along with these descriptions may then be exposed to service consumers which may choose a service class from this list and reference it when requesting storage capacity in accordance with a certain class of service.

The 'default' column represents the first parameter value being indicative if all storage resources controllable by a given storage manager should be selected for retrieving monitoring data for determining the storage capacity available for a requested service class. Depending on the configuration of the storage resources, each of the resource managers may support all storage devices of the vendor and model in the provider's environment which they have been created for by default (if the first parameter value equals 'yes' implying 'All assigned per default'). If the first parameter value has assigned the data value 'no' implying 'NONE assigned per default', none of the storage resources supported by a given storage manager is per default (but possibly by means of the second mapping) selected for calculating a score value and/or determining the storage capacity available for a given service request. The assignment of service classes to storage resources may further be specified in a second mapping 211 as exemplary depicted in table 3, wherein individual storage resources are respectively assigned to or are unassigned from one or more service classes:

TABLE 2 first Mapping of service classes and resource managers

| Service Class | Resource manager | Default |
|---|---|---|
| MediumAvailabilityForFiles | SnapshotFileForIBMSONAS | yes |
| MediumAvailabilityForFiles | SnapshotFileForNetApp | yes |
| HighAvailabilityForFiles | AsyncMirrorFileForIBMSONAS | yes |
| HighestAvailabilityForFiles | AsyncMirrorSnapshotFileForIBMSONAS | yes |
| HighPerformanceForFiles | HighPerformanceFileForIBMSONAS | yes |
| HighPerformanceForFiles | HighPerformanceFileForNetApp | yes |
| FlashCopyBlock | FlashCopyBlockForIBMDS8000 | yes |
| FlashCopyBlock | FlashCopyBlockForIBMSVC | yes |
| GlobalMirrorBlock | GlobalMirrorBlockForIBMDS8000 | yes |
| GlobalMirrorBlock | GlobalMirrorBlockForIBMSVC | yes |
| HighPerformanceBlock | HighPerformanceBlockForDS8000 | no |

TABLE 3 second mapping of service classes to storage resources

| Service Class | Storage Resource | Assigned/ Unassigned |
|---|---|---|
| all | IBM-SONAS-private-12345 | Unassigned |
| all | NetApp-FAS2000-1382 | Unassigned |
| HighPerformanceForFiles | NetApp-FAS2000-1382 | Assigned |
| HighPerformanceBlock | StoragePool-HiPerf-2735 | Assigned |

The "Assigned/Unassigned" column comprises a list of values of a second parameter being indicative of an assignment or un-assignment of a given storage resource to one or more (or even 'all') service classes.

All storage resources controllable by a resource manager mapped according to the first mapping depicted by table 1 to a requested service class are selected for calculating the score and/or for determining the storage capacity available for a given service class in case the first parameter value is indicative of a per-default mapping. For example, the resource manager SnapshotFileForIBMSONAS may have assigned according to a general mapping 209 a plurality of storage resources controllable by said resource managers, among them storage resource "IBM-SONAS-private-12345". According to the first mapping (table 2), resource manager SnapshotFileForIBMSONAS is assigned to service class MediumAvailabilityForFiles, whereby said mapping is flagged by a data value default='yes'. Thus, per default, storage capacity provided by any one of the storage resources mapped to MediumAvailabilityForFiles may be used for score calculation and capacity determination in case of a service request for class MediumAvailabilityForFiles was received. However, storage resource "IBM-SONAS-private-12345" will not be selected for said tasks as it has been unassigned from all service classes in the second mapping. No table corresponding to the general mapping is shown. The general mapping may be based on a dynamic execution of an evaluation rule etc. For example, the general mapping may comprise a program routine determining all resource managers of table 1 whose name ends with 'SONAS' and consider each SONAS storage resource as a storage resource being controllable by said resource manager.

Likewise, by default, all NetApp FAS2000 storage resources will be used in response to requested service classes mapped to any of the resource managers listed in table 1 whose name ends with "NetApp". However, the specific storage resource NetApp-FAS2000-1382 will not be selected for score calculation or storage capacity allocation as said storage resource is unassigned in the second mapping from "all" service classes except for the service class HighPerformanceForFiles. Due to the explicit assignment in the second mapping (table 3), storage resource NetApp-FAS2000-1382 will only be selected in case a storage request for a HighPerformanceForFiles service class was received. Service class HighPerformanceBlock is not marked as a "default" service class in table 3 above, but is assigned explicitly to one specific storage resource, a particular storage pool. So requests for storage capacity which ask for service class "HighPerformanceBlock" will be handled by allocating LUNs from pool "StoragePool-HiPerf-2735", as specified in table 3, provided the capacity of this pool is sufficient.

Figure 4:
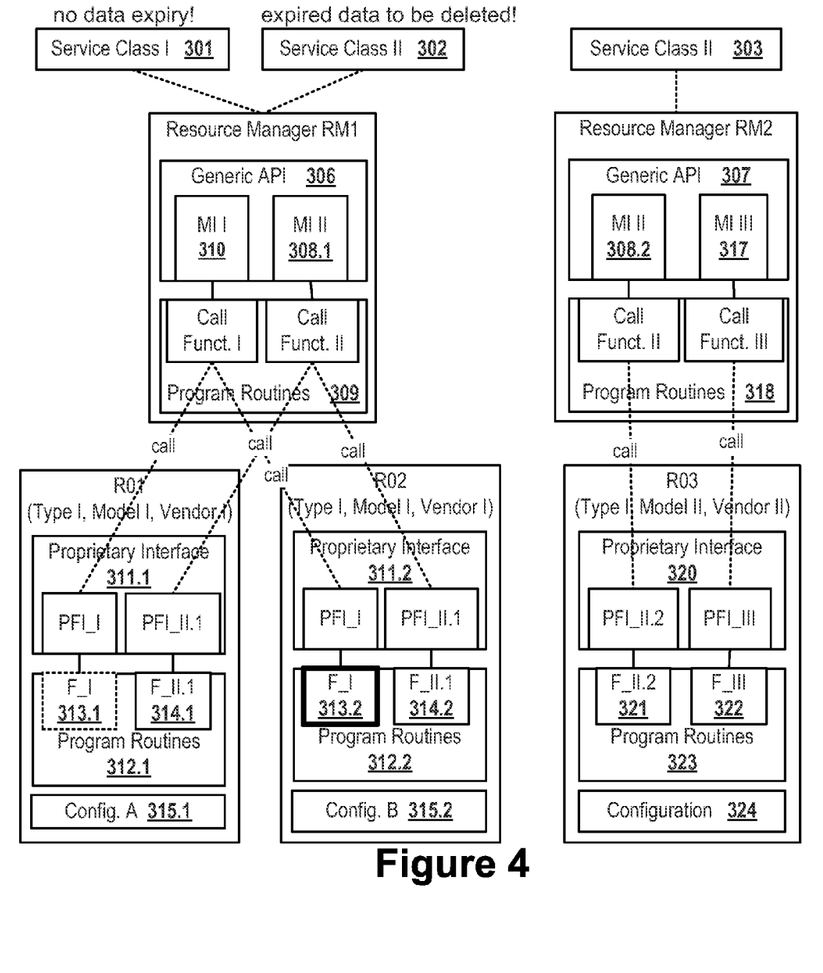
FIG. 4 illustrates an assignment of multiple service classes, resource managers and storage resources.

FIG. 4 is a block diagram showing the resource managers "RM1-RM5" and storage resources R01-R09 in greater detail. Service classes 301-302 are mapped to resource manager RM1 in the first mapping and service class 303 is mapped to resource manager RM2. Service class I 301 may comprise a requirement that data stored to a storage capacity provided in accordance with this service class should be stored permanently. Service class II 302 may comprise a requirement that data older than a predefined time interval should be considered as expired and be deleted by any storage service providing storage capacity in accordance with this service class.

Resource manager RM1 comprises generic API 306 and generic API 306 comprises method interface I 310 and method interface II 308.1. Resource manager RM1 further comprises program routines 309 and program routines 309 comprises call functions, such as call function I and call function II. Similar to resource manager RM1, Resource manager RM2 comprises generic API 307 and generic API 307 comprises method interface II 308.2 and method interface III 317. Resource manager RM2 further comprises program routines 318 and program routines 318 comprises call functions, such as call function II and call function III.

Data expiration: Storage resource R01 differs from R02 in that its configuration A 315.1 causes a deactivation of the data-expiration functionality F_I 313.1 (indicated by a dotted border) while configuration B 315.2 activates said functionality F_I 313.2 (indicated by thick border line). By means of the first and second mapping, storage capacity of storage resource R01 but not of storage resource R02 is provided in response to a request for service class 301 while storage capacity of storage resource R02 but not of storage resource R01 is provided in response to a request for service class 302. Storage resource R03 utilizes configuration 324 to activate/deactivate functionality F_II 321 and functionality F_III 322.

Calling storage type specific functions: Storage resources R01 and R02 are controllable by resource manager RM1 as both share the same model and storage type and were derived from the same vendor. Accordingly, their respective proprietary interfaces 311.1 and 311.2 are identical and can both be accessed by resource manager RM1. Each resource manager RM1, RM2 can be called by the SMS via its generic API 306, 307 comprising method interfaces which have the same method signature if they relate to the same underlying storage function. For example, the signature of method interfaces 308.1 and 308.2 for "providing file system based data access" may be identical although the underlying functionality 314.2, 321 is provided by proprietary program routines 312.2, 323. Storage resources R01 (R02) and R03 were obtained from different vendors, have different models, but share the same storage type. R01 (R02) and R03 are adapted to provide file system based data access functionality F_II. Each resource manager comprises program routines 309, 318 being adapted to call a proprietary interface 311.1, 311.2, 320 of a storage resource. Said routines 309, 318 are typically not generic but need to be adapted for each kind of supported storage resource. Thus, the method interfaces 308.1 and 308.2 for providing file system based data access are callable via a method interface 308.1, 308.2 having the same method signature, whereby calling function F_II (F_II 314.1, F_II.1 314.2, F_II.2 321) via said generic method interfaces 308.1 and 308.2 results in the execution of proprietary program routines 312.1, 312.2, and 323 called via proprietary interface methods PFI_II.1, PF_II.2. Further the method interface 317 provides file system based data access that is callable via the method interface 317, whereby calling function F_III 322 via said generic method interface 317 results in the execution of proprietary program routine 323 called via proprietary interface methods PFI_III.

The invention claimed is:

1. A computer-implemented method for providing storage resources of a storage management system, the method comprising:
   receiving a storage service request comprising an indication of a service class, wherein the indicated service class is a data object having one or more requirements to be fulfilled by any storage service provided in accordance with the service class;
   determining a set of resource managers mapped to the indicated service class according to a first mapping, each resource manager being a runtime data object comprising a generic API providing control over one or more of the storage resources, wherein the set of determined resource managers have assigned storage resources sharing a storage type that share one or more storage-type-specific method interfaces, wherein the storage-type-specific method interfaces enable the storage management system to control one or more respective storage-type-specific functions; and
   for each of the set of determined resource managers:
      determining selected ones of the storage resources controllable by the determined resource manager;
      gathering monitoring data of the selected storage resources, wherein the gathered monitoring data is indicative of free capacities of the selected storage resources;
      comparing the gathered monitoring data with the one or more requirements of the indicated service class for calculating a score for each one of the selected storage resources; and
      calling at least one function of the determined resource manager operable to control a storage resource having an optimum score via the generic API associated with the resource manager thereby configuring or initializing the storage resource to provide the storage service in accordance with the indicated service class.

2. The computer-implemented method claim 1, further comprising:
   upon adding a new storage resource to the storage management system, the new storage resource being one or more of a new vendor of the storage resource, a new storage type, a new storage model, or an offering of a new function, adding a new resource manager to the storage management system, the new resource manager comprising new executable routines, wherein the new executable routines being one or more of vendor-specific, storage type specific, storage model specific, or implementing the new function, thereby enabling the resource management system to configure or initialize said new storage resource for providing the new storage resource upon request.

3. The computer-implemented method of claim 2, further comprising:
   for each unique combination of two, three or four out of a set of properties of the storage resources, providing a resource manager implementing executable routines particular to the unique combination of the set of properties, the set of properties comprising one or more of a vendor, a storage type, a storage model, or a function of the storage resource.

4. The computer-implemented method of claim 1, wherein the generic APIs of the set of determined resource managers are operable to control one or more storage resources sharing a function and a method interface, wherein the method interface enables the storage management system to control the shared function.

5. The computer-implemented method of claim 1, wherein the determination of the selected ones of the storage resources controllable by any one of the set of determined resource managers comprises:
   accessing the first mapping, wherein each pair of mapped service class and resource manager is flagged by a first parameter value;
   responsive to the first parameter value of any one of the pairs of mapped service class and resource manager having a first data value, using all storage resources controllable by the resource manager of the pair of mapped service class and resource manager as the selected storage resources of the resource manager; and
   responsive to the first parameter value of the pair of mapped service class and resource manager having a second data value, not using any of the storage resources controllable by the resource manager of the pair of mapped service class and resource manager as the selected storage resource of the resource manager.

6. The computer-implemented method of claim 1, wherein the determination of the selected ones of the storage resources controllable by one of the set of determined resource managers comprises:
   accessing a second mapping, the second mapping comprising pairs of service classes and storage resources mapped to each other, wherein each of the pairs of service classes and storage resources is flagged by a second parameter value;
   responsive to the second parameter value of any one of the pairs of service classes and storage resources having a third data value, using the storage resource of the pair of service classes and storage resources as one of the selected storage resources; and
   responsive to the second parameter value of the pair of service class and storage resource having a fourth data value, not using the storage resource of the pair of service classes and storage resources as the selected storage resources.

7. The computer-implemented method of claim 6, wherein the selected ones of the storage resources are determined in accordance with the first mapping and the second mapping, wherein mapping information in the second mapping for determining the selected storage resources overrule respective mapping information in the first mapping.

8. The computer-implemented method of claim 1, comprising:
   generating a list of service classes supported by the storage management system; and
   providing interface means for outputting the list of service classes and for allowing a requestor of the storage service to select one of the service classes from the list of service classes and to include an indication of the selected service class into the storage service request submitted via the interface.

9. The computer-implemented method of claim 1, comprising:
   adding a new service class associated with new requirements;
   responsive to one or more of the resource managers being operable to control a storage resource in accordance with the new requirements, mapping the new service class to the one or more resource managers in the first mapping; and
   responsive to none of the resource managers being operable to control the storage resource in accordance with the new requirements, creating a new resource manager operable to control at least one storage resource in accordance with the new requirements and mapping the new resource manager to the new service class in the first mapping.

10. The computer-implemented method of claim 9, wherein the adding of the new service class being executed upon adding a new storage function to the storage management system, wherein the new requirements are requirements in respect to the new storage function.

11. The computer-implemented method of claim 1, comprising:
for each one of all service classes supported by the storage management system:
selecting a current one of the service classes;
determining the resource managers assigned to the current service class according to the first mapping;
determining selected ones of all the storage resources controllable by the determined resource managers;
gathering monitoring data of the selected storage resources for providing monitoring data of the current service-class; and
assembling the monitoring data of all service classes for outputting a report.

12. The computer-implemented method of claim 11, wherein the gathering of the monitoring data of the selected storage resources is executed by one of the resource managers being operable to control the selected storage resources and being mapped according to the first mapping to the service class indicated in the service request or being the current service class.

13. A non-transitory computer-readable storage medium comprising a computer-readable program code embodied therewith which, when executed by a processor, cause the processor to:
receive a storage service request comprising an indication of a service class, wherein the indicated service class is a data object having one or more requirements to be fulfilled by any storage service provided in accordance with the service class;
determining a set of resource managers mapped to the indicated service class according to a first mapping, each resource manager being a runtime data object comprising a generic API providing control over one or more of the storage resources, wherein the set of determined resource managers have assigned storage resources sharing a storage type that share one or more storage-type-specific method interfaces, wherein the storage-type-specific method interfaces enable the storage management system to control one or more respective storage-type-specific functions; and
for each of the set of determined resource managers:
determining selected ones of the storage resources controllable by the determined resource manager;
gathering monitoring data of the selected storage resources, wherein the gathered monitoring data is indicative of free capacities of the selected storage resources;
comparing the gathered monitoring data with the one or more requirements of the indicated service class for calculating a score for each one of the selected storage resources; and
calling at least one function of the determined resource manager operable to control a storage resource having an optimum score via the generic API associated with the resource manager thereby configuring or initializing the storage resource to provide the storage service in accordance with the indicated service class.

14. A computer system operatively coupled to a plurality of storage resources, the computer system comprising:
a processor; and
a memory coupled to the processor, wherein the memory comprises instructions which, when executed by the processor, cause the processor to:
receive a storage service request comprising an indication of a service class, wherein the indicated service class is a data object having one or more requirements to be fulfilled by any storage service provided in accordance with the service class;
determine a set of resource managers mapped to the indicated service class according to a first mapping, each resource manager being a runtime data object comprising a generic API providing control over one or more of the storage resources, wherein the set of determined resource managers have assigned storage resources sharing a storage type that share one or more storage-type-specific method interfaces, wherein the storage-type-specific method interfaces enable the storage management system to control one or more respective storage-type-specific functions; and
for each of the set of determined resource managers:
determine selected ones of the storage resources controllable by the resource manager;
gather monitoring data of the selected storage resources, wherein the gathered monitoring data is indicative of free capacities of the selected storage resources;
compare the gathered monitoring data with the one or more requirements of the indicated service class for calculating a score for each one of the selected storage resources; and
call at least one function of the determined resource manager operable to control a storage resource having an optimum score via the generic API associated with the resource manager thereby configuring or initializing the storage resource to provide the storage service in accordance with the indicated service class.

15. The computer system of claim 14, wherein the instructions further cause the processor to:
upon adding a new storage resource to the storage management system, the new storage resource being one or more of a new vendor of the storage resource, a new storage type, a new storage model, or an offering of a new function, add a new resource manager to the storage management system, the new resource manager comprising new executable routines, wherein the new executable routines being one or more of vendor-specific, storage type specific, storage model specific, or implementing the new function, thereby enabling the resource management system to configure or initialize said new storage resource for providing the new storage resource upon request.

16. The computer system of claim 15, wherein the instructions further cause the processor to:
for each unique combination of two, three or four out of a set of properties of the storage resources, provide a resource manager implementing executable routines particular to the unique combination of the set of properties, the set of properties comprising one or more of a vendor, a storage type, a storage model, or a function of the storage resource.

17. The computer system of claim 14, wherein the generic APIs of the set of determined resource managers are operable to control one or more storage resources sharing a function and a method interface, wherein the method interface enables the storage management system to control the shared function.

18. The computer system of claim 14, wherein the instructions to determine the selected ones of the storage resources controllable by any one of the set of determined resource managers further causes the processor to:
- access the first mapping, wherein each pair of mapped service class and resource manager is flagged by a first parameter value;
- responsive to the first parameter value of any one of the pairs of mapped service class and resource manager having a first data value, use all storage resources controllable by the resource manager of the pair of mapped service class and resource manager as the selected storage resources of the resource manager; and
- responsive to the first parameter value of the pair of mapped service class and resource manager having a second data value, not use any of the storage resources controllable by the resource manager of the pair of mapped service class and resource manager as the selected storage resource of the resource manager.

19. The computer system of claim 14, the instructions to determine the selected ones of the storage resources controllable by any one of the set of determined resource managers further causes the processor to:
- access a second mapping, the second mapping comprising pairs of service classes and storage resources mapped to each other, wherein each of the pairs of service classes and storage resources is flagged by a second parameter value;
- responsive to the second parameter value of any one of the pairs of service classes and storage resources having a third data value, use the storage resource of the pair of service classes and storage resources as one of the selected storage resources; and
- responsive to the second parameter value of the pair of service class and storage resource having a fourth data value, not use the storage resource of the pair of service classes and storage resources as the selected storage resources.

* * * * *